United States Patent [19]

Deprez

[11] 4,264,248
[45] Apr. 28, 1981

[54] CONTROLLABLE TOOLING FOR GEAR CUTTING MACHINE

[75] Inventor: Thomas A. Deprez, Rochester, N.Y.

[73] Assignee: The Gleason Works, Rochester, N.Y.

[21] Appl. No.: 44,807

[22] Filed: Jun. 1, 1979

[51] Int. Cl.³ .................. B23F 1/08; B23F 21/26
[52] U.S. Cl. .................... 409/46; 409/58; 409/59
[58] Field of Search .......... 409/42, 43, 46, 47, 409/59, 3, 262, 287, 60, 10; 407/7

[56] References Cited

U.S. PATENT DOCUMENTS

| | | | |
|---|---|---|---|
| 1,469,602 | 10/1923 | Perkins et al. | 409/59 X |
| 1,737,217 | 11/1929 | Colman | 409/41 |
| 2,346,867 | 4/1944 | Pelphrey | 409/60 |
| 2,352,689 | 7/1944 | Carlsen | 409/44 |
| 2,374,901 | 5/1945 | Sneed | 409/60 |
| 2,385,330 | 9/1945 | Candee et al. | 409/44 |
| 2,385,331 | 9/1945 | Carlsen | 409/44 |
| 2,638,036 | 5/1953 | Miller | 409/45 |
| 2,678,587 | 5/1954 | Praeg | 409/47 X |
| 3,096,685 | 7/1963 | Demuth | 409/3 |
| 3,417,510 | 12/1968 | Wildhaber | 409/42 X |
| 3,459,103 | 8/1969 | Birch | 409/60 |
| 3,508,462 | 4/1970 | Wildhaber | 409/46 X |
| 3,587,385 | 6/1971 | Orend | 409/232 |
| 3,659,496 | 5/1972 | Bergemann et al. | 407/7 X |
| 4,140,042 | 2/1979 | Demuth | 409/47 X |

FOREIGN PATENT DOCUMENTS 2010716 7/1979 United Kingdom ............... 409/3

Primary Examiner—William R. Briggs
Attorney, Agent, or Firm—Morton A. Polster; Ralph E. Harper

[57] ABSTRACT

Controllable tooling is mounted in a carrier with parallel spring elements positioned at right angles to an intended path of adjustment for the tooling so that precisely controlled adjustments can be applied to the tooling while it is performing a cutting operation on a workpiece.

9 Claims, 7 Drawing Figures

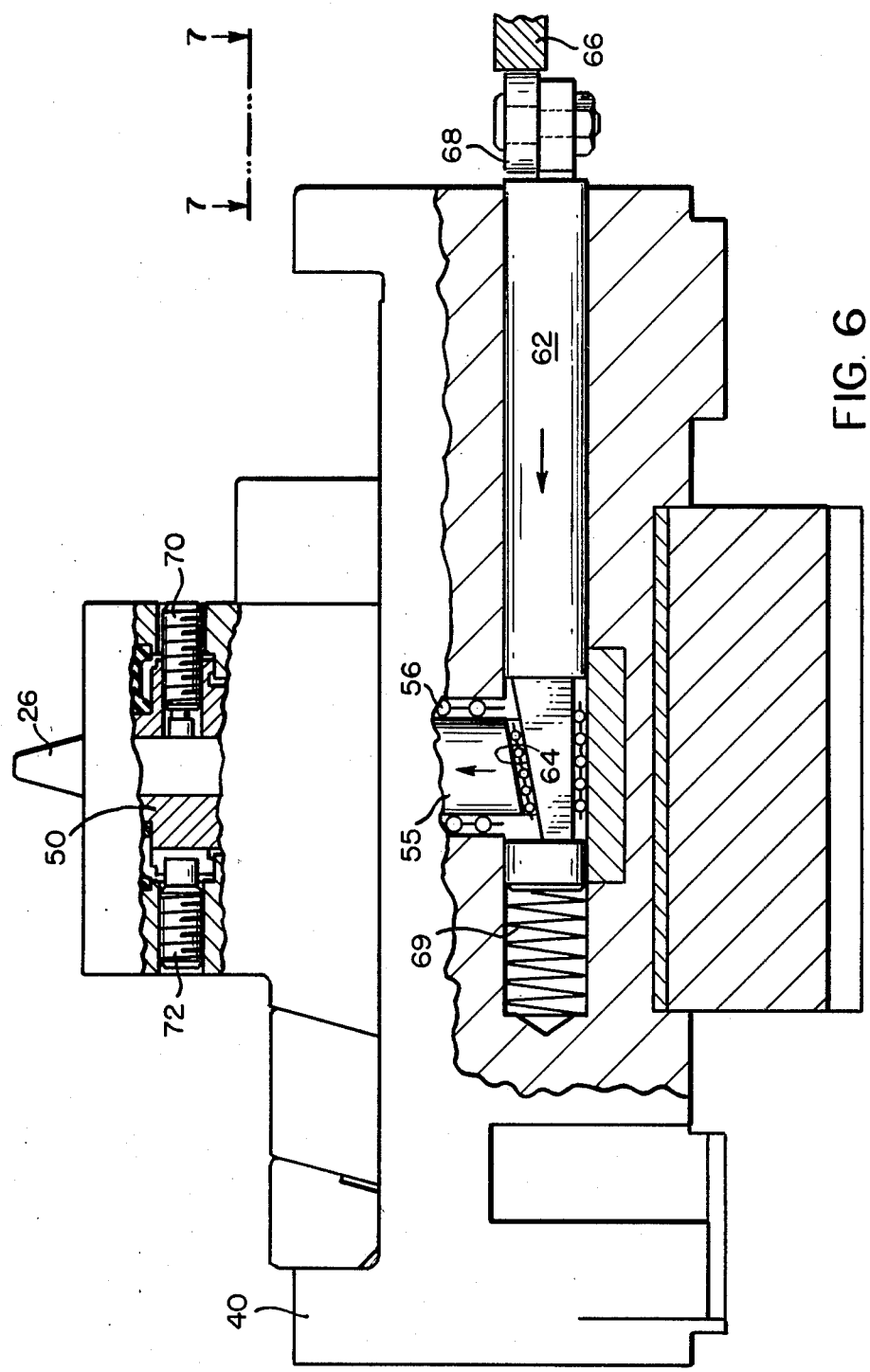

CONTROLLABLE TOOLING FOR GEAR CUTTING MACHINE

BACKGROUND AND BRIEF DESCRIPTION OF INVENTION

It is known in the art of gear cutting to provide for machines which utilize an endless chain for carrying a series of cutting tools into engagement with a workpiece to shape the workpiece into a gear form. It is also known to arrange a series of cutting tools around a cylindrical body for forming gears.

Although existing gears cutting equipment does a very satisfactory job of shaping gear tooth profiles, such as those required for spur and helical gears, certain gear applications require a refinement of such equipment to provide a lengthwise "crowning" of individual tooth members of whatever gear is being manufactured. Crowning is a known feature of certain types of bevel gear making machinery (as shown, for example, in U.S. Pat. Nos. 2,352,689; 2,385,330; and 2,385,331), however, it is not believed to be known for other types of gear making machinery which provide for a movement of one or more rows of cutting tools in a flat plane through a tooth slot. For example, when a series of cutting tools are rigidly secured in one or more carriers which are advanced into engagement with a workblank, a generally straight cut is formed when viewed in the longitudinal (or lengthwise) direction of each tooth slot being shaped into the workpiece. In order to crown the side wall portions of such a straight cut, it is required that there be a deeper cut at the entry and exit ends of the tooth slot as a cutting tool advances into and out of the slot. It is a primary purpose of this invention to provide an improved mechanical arrangement for controlling positions of selected cutting tools as they advance through tooth slots of a workpiece to thereby provide for a desired depth of cut to thereby achieve crowning of the individual tooth profiles.

In accordance with a specific embodiment of the present invention, selected stock-removing tools of a gear cutting machine are held by a number of carriers articulated together to form an endless chain which can be advanced into engagement with a workpiece to form tooth slots for a spur or helical gear. Mounting means are provided for securing selected tools of the series for controlled movements relative to their respective carriers to thereby provide for precision cutting and shaping of gear tooth profiles as the selected tools are advanced through slots of the workpiece. Control means are associated with the carriers for controlling the positions of the mounting means relative to the carriers in a way which extends or retracts the selected tools during a cutting operation as the tools are brought into engagement with the workpiece. Each mounting means comprises a mounting block for receiving a stock-removing tool in fixed relationship thereto, and the mounting block is suspended in a novel way within a bore of an associated carrier with spring elements comprising flat ring elements which are fitted around the mounting block and within the bore of the carrier. The spring elements are arranged in parallel planes at right angles to the desired axis of motion for the tools. The use of such spring elements eliminates the need for bearings or bearing surfaces and provides for radial rigidity of the tool while permitting linear motion of the tool. In addition, this type of suspension of a tool provides for a more rapid response with less of a tendency to initially stick and then slip to a new position. A displaceable member is fitted within the carrier for contacting and moving the mounting means in accordance with the degree and type of precision shaping required, and each displaceable member is actuated, in turn, by a control bar which follows a cam surface provided on a relatively fixed portion of the gear machine. In this way controlled movements are dictated to the selected tools as the tools move through a work zone of the machine.

The mechanism of the present invention is very reliable in design and provides for a positive and known displacement of the selected cutting tools at exactly the right points of travel of each tool relative to a tooth slot of the workpiece. The use of spring elements for suspending the tools provides for a simple and highly reliable system for positioning and moving the tools. Individual components of the mechanism are designed to withstand the stresses and workloads associated with production manufacture of gears or similar type products. These and other advantages and features of the invention will become apparent in the more detailed discussion which follows, and in that discussion reference will be made to the accompanying drawings as briefly described below.

BRIEF DESCRIPTION OF DRAWINGS

FIG. 6 is a sectional view taken in a plane at right angles to the view shown in FIG. 5.

DETAILED DESCRIPTION OF INVENTION

Figure 1:
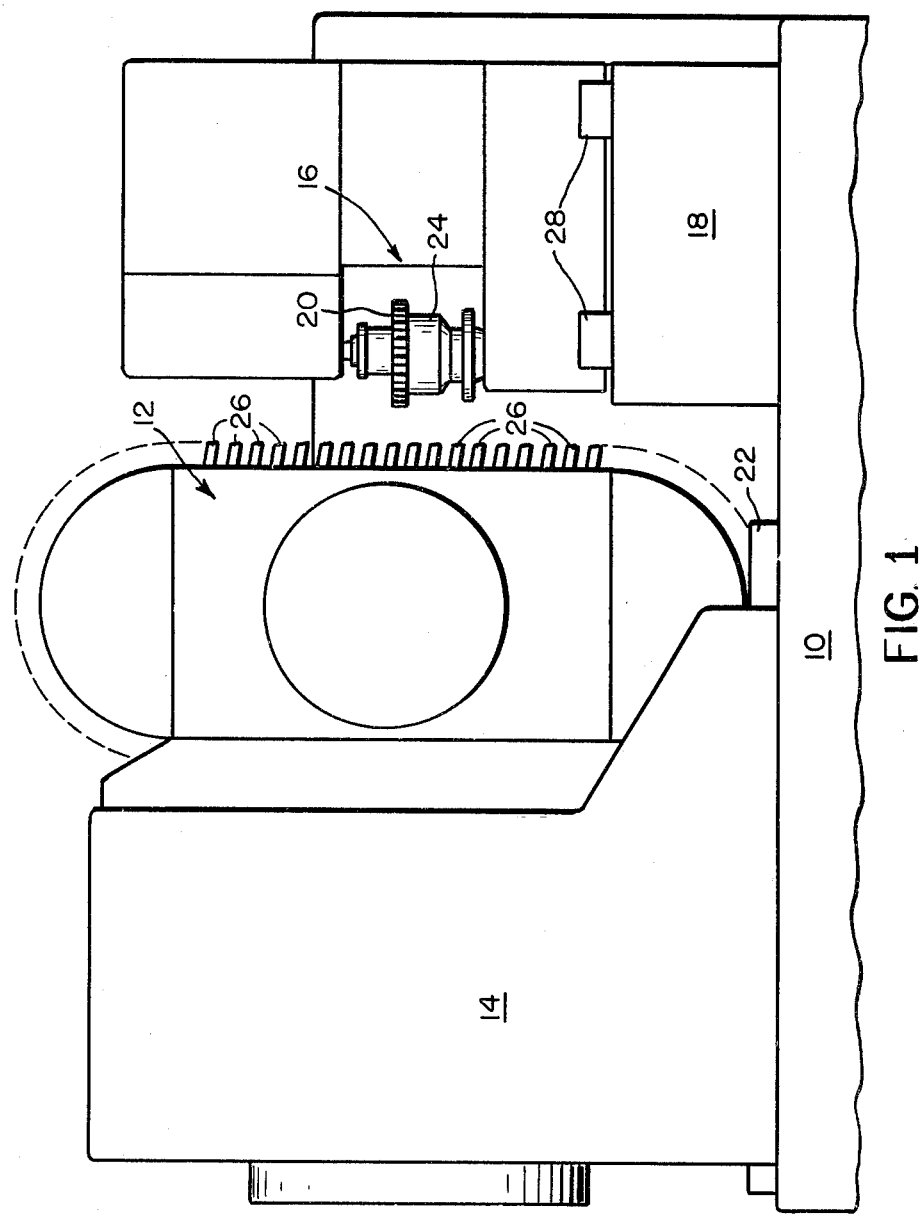
FIG. 1 is an elevational view of a gear cutting machine incorporating the tooling of the present invention.

Although the controllable tooling of the present invention may be utilized with various kinds of metalworking and gear cutting machines, it was specifically developed for the type of machine shown in FIG. 1. This type of gear cutting machine is designed to cut spur or helical gears through the engagement of a series of stock-removing tools with a workpiece as the tools are advanced about the circumference of a relatively large machining head. In a machine of this type, a number of stock-removing tools are carried on individual link members of an endless chain assembly which extends around the entire machining head portion of the machine, and in this manner, a great number of stock-removing tools can be brought into engagement with a workpiece.

Considering the specific details of the machine shown in FIG. 1, it can be seen that basic machine assemblies are carried on a common base 10, and these components include a tool carrying assembly 12 mounted on a housing 14 together with a work station 16 mounted on its own base 18. The tool carrying assembly 12 can be advanced towards and away from a workpiece 20 through a sliding action of the housing 14 on ways 22. The workpiece 20 is mounted on a work spindle 24 for timed rotation or incremental rotation in relationship to the advancement of stock-removing tools 26. The illustrated stock-removing tools may be of any known design. In a specific use of this invention, tools of the type in which the cutting face is not resharpened (as shown in U.S. Pat. No. 4,060,881) were used. Transverse placement of the workpiece relative to the cutting tools can be achieved through a movement of the work station 16 on ways 28 mounted on the base 18.

In operation, the type of machine just described provides for an engagement of the cutting head portion of the machine with a workblank contained within the work station portion of the machine. As the cutting tools engage the workpiece, tooth slots are formed in precisely spaced positions about the circumference of the workpiece to thereby form a spur or helical gear, depending upon the relative tilt of the tool carrying assembly 12 to the workpiece. Individual profiles are formed by a generating action between the cutting tools and the workpiece as the tools are brought into full depth engagement with the workpiece and as the workpiece is precisely rotated relative to the cutting tools. After a single tooth slot has been formed, the cutting tools of the machine are retracted out of engagement with the workpiece, and the workpiece is indexed to a position for forming a next adjacent tooth slot to the one just formed. In this manner, tooth slots and tooth profiles are formed about the entire circumference of a workblank.

Figure 2:
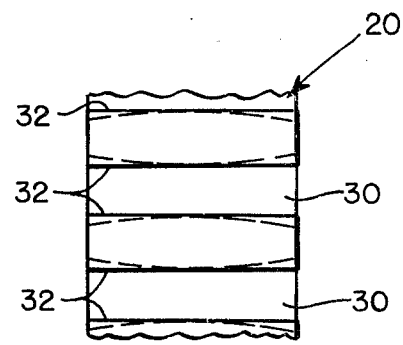
FIG. 2 is a schematic view of tooth profiles obtainable with the controllable tooling of the present invention.

As shown in FIG. 2, the normal action of the machine operation just described is to produce tooth slots 30 which have sidewalls 32 having no crowning curvature from one face of the gear to an opposite face of the gear. This results from the sequential entry of a series of cutting tools at one end of the tooth slot, followed by a straight line movement of the cutting tools through the tooth slot until the tools leave the slot at an opposite side of the gear.

Figure 3:
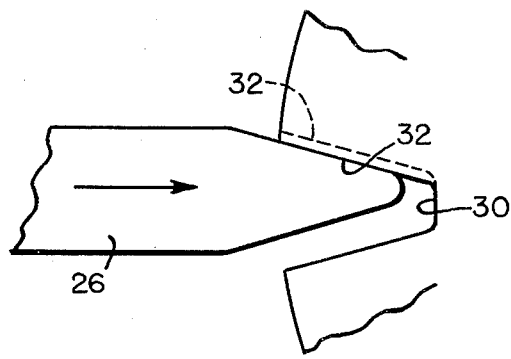
FIG. 3 is a schematic view of a single cutting tool moving through a tooth slot of a gear blank.
Figure 7:
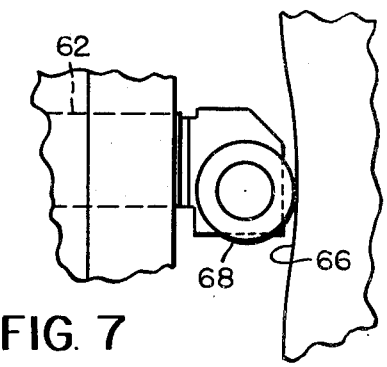
FIG. 7 is a view of a cam and follower, as seen on line 7—7 of FIG. 6.

FIG. 2 also illustrates (with dashed lines) a type of "crowning" curvature which is sometimes desirable for tooth profiles of spur or helical gears. Although the crowning is greatly exaggerated in the FIG. 2 view (for purposed of clarity), it can be appreciated that even a very mild amount of lengthwise curvature of the tooth slot requires a repositioning of individual cutting tools as they pass through the tooth slot. One way of achieving such crowning is shown in FIG. 3 wherein a single cutting tool 26 is illustrated as engaging a single sidewall 32 of a tooth slot 30. As can be seen, the tooth slot is of a type which is formed to full depth by separate cutting tools of a series which define a bottom for the slot so that the illustrated cutting tool is not required to carry out a dual function of shaping the sidewall 32 as well as the bottom of the tooth slot. However, it is possible to use tooling which cuts side and bottom portions of the tooth slot simultaneously. The dashed line position of the wall 32, as shown in FIG. 3, represents the increased depth of cutting which can be achieved with the cutting tool 26 if the tool is moved in the direction of the arrow. This movement has the effect of removing a greater amount of stock from the sidewall portion of the workpiece. Thus, it can be seen that such a movement of the cutting tool during the initial part of its travel through a tooth slot and again upon leaving the tooth slot will produce the type of curved shape shown by the dashed lines in the FIG. 2 view. Such movement is very precise and very slight and requires a high degree of control of position of the tool as the tool progresses through a tooth slot of a workpiece. This control is achieved with the mechanisms described in FIGS. 4–7.

Figure 4:
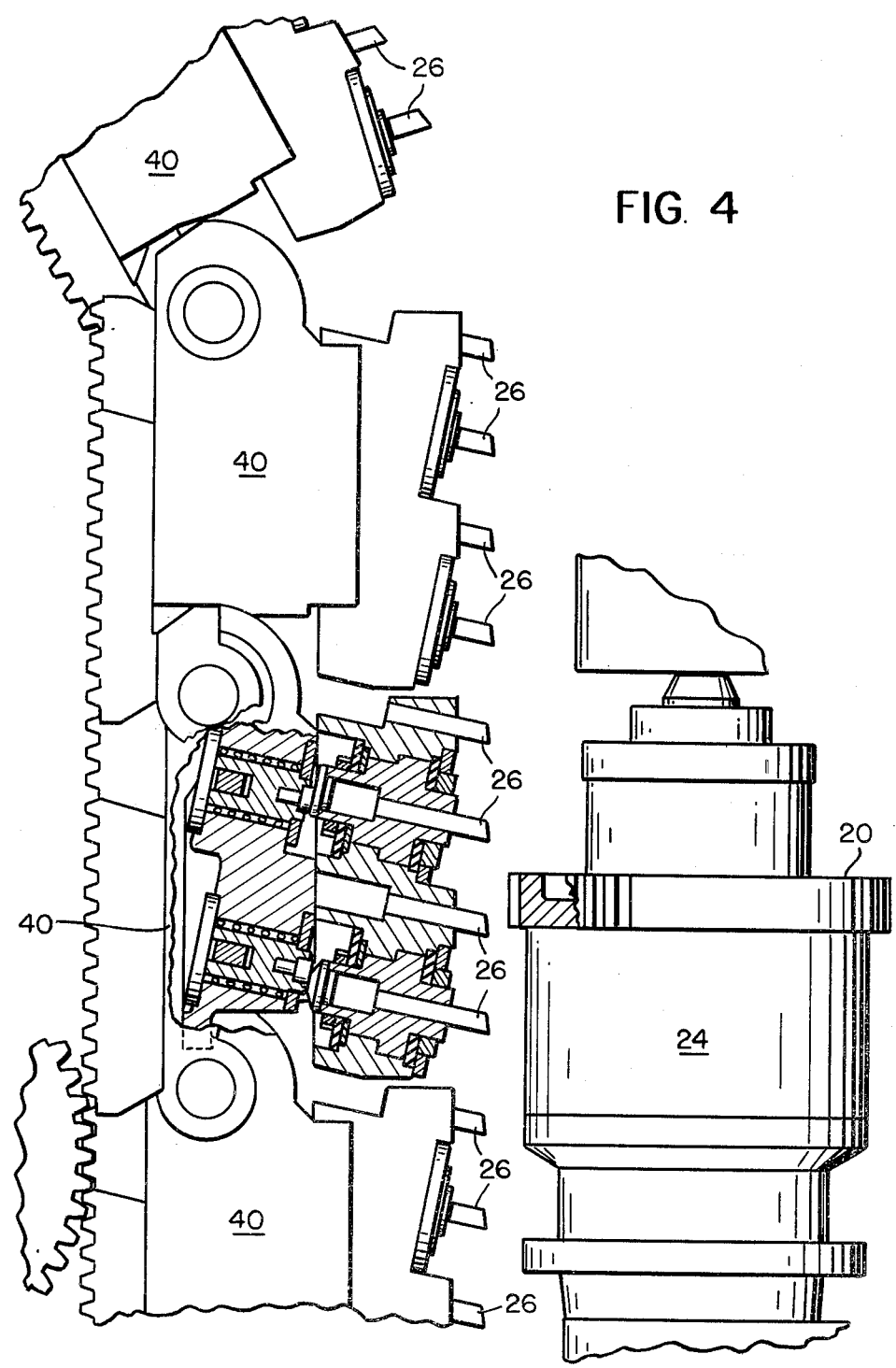
FIG. 4 is an enlarged elevational view, partly in cross-section, of the machine of FIG. 1, showing a number of articulated link members for carrying the stock-removing tools of the machine.

FIG. 4 shows a number of articulated link members 40 making up the endless chain of the machine of FIG. 1. The individual link members 40 may be considered as carriers for a series of cutting tools 26 which are arranged in a single row about the entire circumference of the endless chain. The manner in which the links are driven and other details of the operation of the machine itself are now known in the art and are disclosed, for example, in pending application Ser. No. 929,600, filed on July 31, 1978. In addition, endless chain type machines are shown in the U.S. Pat. Nos. 1,468,393 and 1,469,602. In the arrangement shown in FIG. 4, every other cutting tool 26 of the series is arranged to be axially controlled in its position relative to the carrier 40 with which it is associated. Tools which are not so controlled are fixed in their relationship to the carrier and serve, for example, to rough out a tooth slot or to define the full depth bottom portion of the slot, leaving it to the remaining controllable tools to shape the sidewall portions thereof.

Figure 5:
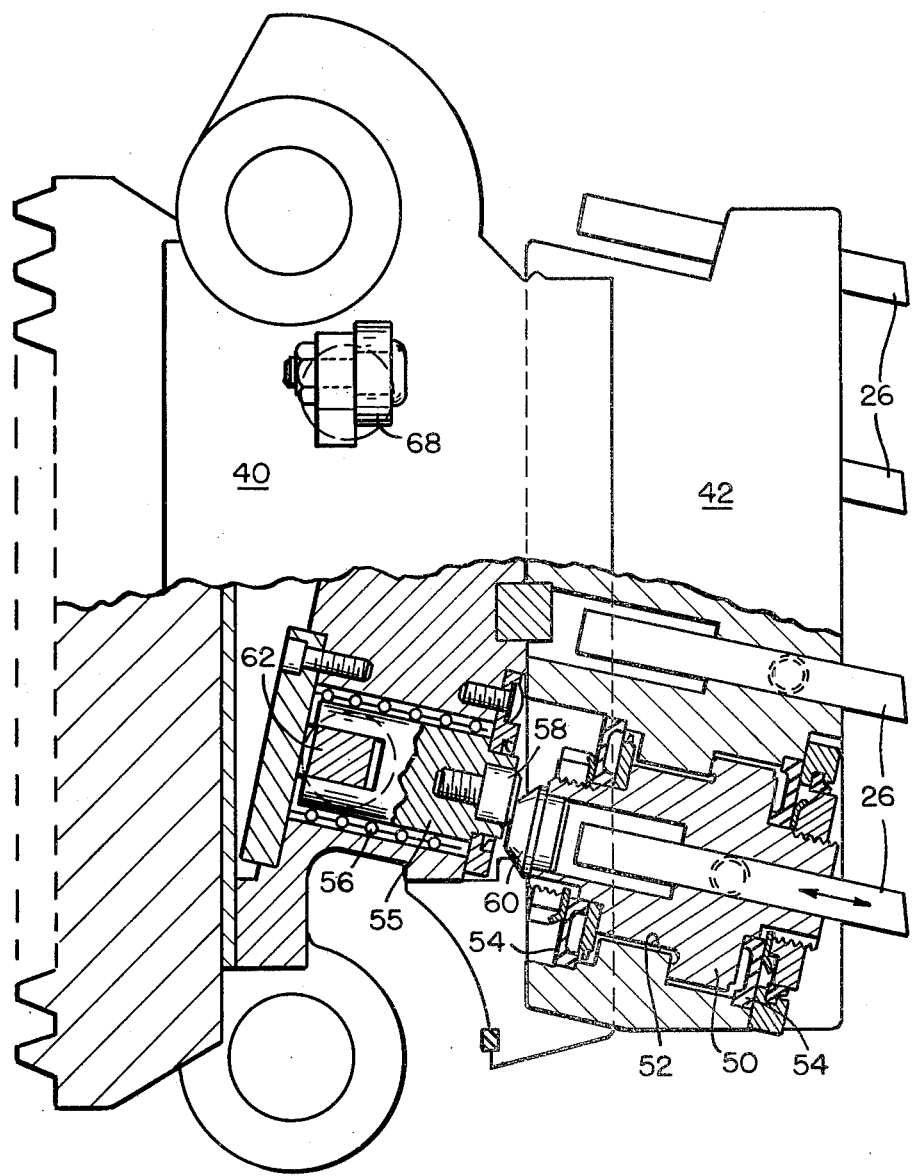
FIG. 5 is a greatly enlarged view, partly in cross-section, of a single link member of the machine of FIG. 1, showing details of the tool adjusting mechanism of this invention.

Referring to FIGS. 5 and 6, it can be seen that each of the controllable tools is secured within a mounting means 50 which comprises a mounting block having an exterior profile made up of cylindrical surfaces for being fitted within a bore 52 formed in the carrier. The mounting block 50 is suspended within the bore with a pair of spring elements 54 which comprise metallic, flat, ring elements fitted around opposite ends of the mounting block and within the bore of the carrier to provide for a secure suspension of the mounting block within the bore. These springs serve to constrain the tool radially while, at the same time, permitting limited (on the order of 0.001 to 0.005 inches) axial movement of the tool. This arrangement is simple and reliable and eliminates the need for fitting the tool within bearing surfaces since there is no functional engagement of the tool with the mounting block or with the carrier. The spring elements 54 are placed at right angles to the intended line of travel of the tool, thus assuring accurate linear movement of the tool with no deviation from its intended path of travel. As the mounting block is moved (in axial directions along the axis of the cutting tool 26), the spring elements 54 are flexed away from their normal positions shown in FIG. 5, and there is a tendency for the mounting block to be returned to its normal position as soon as it is released from a displaced position. The mounting block 50 is contacted and moved by a separate displaceable member 55. The displaceable member 55 is of a generally cylindrical form and is fitted within a separate portion of the link member 40 so that it does not have to be removed from the link when the tool holder portion 42 is removed for changing or adjusting tools. The displaceable member 55 is mounted within a pair of sleeves having roller bearings 56 therebetween, and a hardened end portion 58 is provided for making actual contact with a similarly hardened end portion 60 of the mounting block 50. Thus, as the displaceable member 55 is moved toward and away from the mounting block 50, the mounting block 50 is, in turn, advanced and retracted relative to a workpiece.

Control of the displaceable member 55 is achieved through the use of a control bar 62 (see also FIG. 6) having an inclined surface 64 for contacting a portion of the displaceable member 55. As can be seen from the views of FIGS. 6 and 7, transverse movements of the control bar 62, as determined by a cam 66 and a follower 68 carried at the end of the control bar dictate movement of the displaceable member 55 and the mounting block 50 with its contained cutting blade 26. It can be seen that the control bar 62 is fitted transversely through a portion of the carrier 40 with its follower being carried externally thereof for contacting a cam surface 66 arranged along the side of the machine housing in which the endless chain is mounted for movement. The shape of the profile of the cam surface 66 determines the precise point at which shaping begins and ends in any tooth slot of a workpiece being formed by the cutting tools being carried by the endless chain. The working end of the control bar 62, including the inclined surface 64 formed thereon, is mounted on bearings for ease of operation. The control bar 62 is loaded against a spring 69 which is arranged to maintain the follower 68 of the control bar in contact with the cam surface 66.

FIG. 6 also shows details for the securement of individual cutting blades 26 into respective mounting blocks 50 with screw fasteners 70. In addition there is shown a key element 72 which serves to engage a slot formed in a cylindrical portion of the mounting block 50 to prevent rotation of the mounting block (and its contained cutting tool) within the carrier in which it is mounted.

Having described structural features and detail of a specific and preferred embodiment of the present invention, it can be appreciated that similar arrangements can be provided on fully equivalent machinery to that which has been disclosed herein. For example, the cutting tools which are shown could just as well be grinding elements, and the novel spring mounting of the tools can be applied to other forms of machinery and to other tool holding requirements. Equivalent substitutions of structural detail and equivalent uses are intended to be included within the scope of protection defined in the claims below.

What is claimed is:

1. In a machine of the type which relatively advances a series of stock-removing tools into engagement with a workpiece to shape the workpiece, the improvement comprising
   a carrier for holding a plurality of said stock-removing tools and for moving said tools in a plane which establishes a depth of cut for the tools relative to a workpiece, said tools being mounted in said carrier with spring elements comprising rings surrounding the tools in parallel planes so as to permit limited axial movement of the tools while preventing radial movement thereof,
   control means for controlling movement of said stock-removing tools relative to said carrier so that said depth of cut of the tools can be adjusted as each tool advances in engagement with a workpiece, said control means including
   a control bar operatively connected with the stock-removing tools for moving selected tools towards and away from a workpiece to thereby change the depth of cut of the selected tools as the tools are removing stock from the workpiece, said control bar being supported by said carrier for movement therewith,
   a follower carrier by said control bar,
   a cam surface provided on said machine for being contacted by said follower, whereby advancement of said carrier and its contained tools, past said cam surface, will result in following movements by said control bar which, in turn, will cause selected tools to move more or less deeply into cutting engagement with the workpiece.

2. The improvement of claim 1 wherein a plurality of said carriers are linked together to form an endless chain which can be advanced into engagement with a workpiece.

3. The improvement of either claim 1 or 2 wherein a single row of said stock removing tools is provided on each of said carriers and wherein a separate control bar is provided for each of the selected stock removing tools of said series.

4. The improvement of claim 1 wherein each stock removing tool is of a type designed for cutting gear tooth shapes on workpieces, said tool further having a chip face portion that does not require resharpening.

5. In a gear cutting machine of the type in which a series of stock-removing tools are held by a number of carriers articulated together to form an endless chain which can be advanced into engagement with a workpiece to thereby form tooth slots for a spur or helical gear, the improvement comprising
   mounting means for securing selected tools of said series of stock-removing tools for controlled movements relative to said carriers to thereby provide for precision shaping of gear tooth profiles as the selected tools are advanced through tooth slots of a workpiece, each mounting means comprising a mounting block having an exterior profile made up of cylindrical surfaces for being fitted within a bore formed in said carrier and having means for receiving a stock-removing tool in fixed relationship thereto, and wherein said mounting block is suspended within said carrier with spring elements which are fitted around the mounting block and within the bore formed in the carrier for providing limited axial movement of the mounting block and a tool contained therein, while preventing radial movement thereof,
   control means associated with said carriers for controlling the positions of said mounting means relative to the carriers, to thereby extend or retract said selected tools during a cutting operation in which the tools are brought into engagement with a workpiece to form a spur or helical gear.

6. The improvement of claim 5 wherein said spring elements are in the form of flat rings mounted in parallel planes at right angles to the axis of a tool contained therein.

7. The improvement of any of claims 5 or 6 wherein said control means include displaceable members carried by said carriers for contacting and moving said mounting means in accordance with the degree and type of precision shaping required, each of said displaceable members being actuated, in turn, by a control bar which follows a cam surface provided on a relatively fixed portion of the gear machine for dictating controlled movements to said selected tools as the tools move through a work zone of the machine.

8. The improvement of claim 7 wherein said displaceable members are each of a generally cylindrical form and are each arranged to contact an end surface of said mounting means for moving the mounting means and its contained tool.

9. The improvement of claim 8 wherein said control bar is arranged to contact an associated displaceable member along an axis which is at right angles to the axis of movement of said mounting block, and wherein said control bar includes an inclined surface for contacting and moving said associated displaceable member.

* * * * *